Nov. 17, 1970
J. R. DALE ETAL
3,541,498
COMPLIANT SUSPENSION FOR A SONOBUOY HYDROPHONE
Filed June 20, 1969
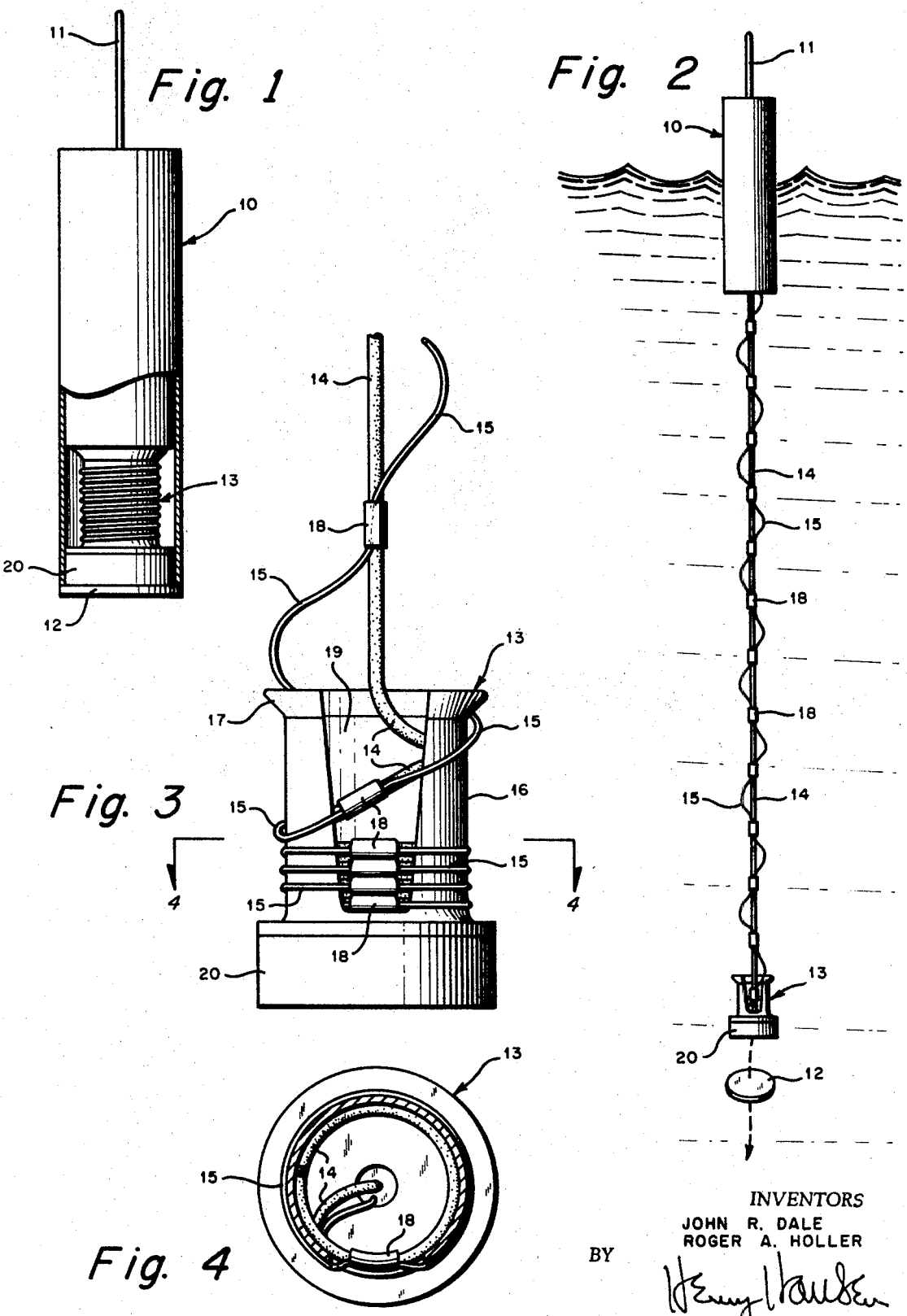
INVENTORS
JOHN R. DALE
ROGER A. HOLLER
ATTORNEY

United States Patent Office 3,541,498
Patented Nov. 17, 1970

3,541,498
COMPLIANT SUSPENSION FOR A SONOBUOY HYDROPHONE
John R. Dale, Willow Grove, and Roger A. Holler, Easton, Pa., assignors to the United States of America as represented by the Secretary of the Navy
Filed June 20, 1969, Ser. No. 834,977
Int. Cl. H04b 1/59; B63b 21/52
U.S. Cl. 340—2                                  5 Claims

ABSTRACT OF THE DISCLOSURE

A sonobuoy hydrophone is maintained in an ocean environment substantially at a constant level through the use of a compliant suspension cable between a flotation unit and the hydrophone. A signal cable is helically disposed around the compliant suspension cable and fastened at each convolution at equally-spaced intervals to the suspension cable in order to minimize noise caused by rubbing of the cables and by the sudden impingement, or slapping of the coil of the signal cable on the hydrophone caused by rapid wave or flow induced motion in a vertical direction. A spool attached to the free end of the suspension cable and to the hydrophone is provided for storage and retention of both cables prior to the deployment of the hydrophone. The spool is slotted longitudinally to permit a suspension cable to be stored convolutely inside the spool and the signal cable stored convolutely outside the spool.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to sonobuoy systems, and more particularly to apparatus and method for deployment of a compliant suspension system which provides for electrical communication between a surface buoy transmitter assembly and a hydrophone suspended therefrom for advantageous deployment in a sonobuoy underwater sound detection system. The invention significantly reduces noise due to indiscriminate movement of the suspension system elements. As applied to airborne ASW (antisubmarine warfare), sonobuoys are designed to be dropped from an aircraft and deployed to detect underwater sounds emanating or reflecting from submarines and to transmit information related thereto for analysis at a remote receiving station, whereby location and identification of the source of the sound may be determined.

Typically a deployed sonobuoy assembly comprises a buoyant transmitter and a submerged hydrophone unit suspended therefrom. The hydrophone may be of a piezoelectric transducer type or any other suitable electroacoustical transducer. The hydrophone when subjected to a variance in ambient pressure caused by sound or other phenomena, transmits a signal through a signal cable to the transmitter which in turn, by radio, transmits a signal to a remote receiver. It has been found that if the transmitter and hydrophone are connected by a noncompliant cable the hydrophone will move up and down with the transmitter due to wave motion. This will cause a change in pressure on the hydrophone and give an erroneous signal to the transmitter.

The sonobuoy must operate in various sea states, although ideally it would operate in a zero sea state, i.e., once the hydrophone is deployed to its operational depth it should remain relatively fixed at that depth regardless of the elevation of the supporting buoy. Obviously, this is impossible because of the various sea states encountered. Therefore, the variation in elevation of the supporting buoy must be compensated for within the system. This is accomplished by providing compliant suspension and signal cables in a combination which varies in length. One such system is characterized by having the signal cable disposed in a helix about the compliant suspension cable. Thus as the hydrophone moves up and down with respect to the buoyant transmitter in accordance with wave motion or other disturbance, the stretch and contraction of the compliant suspension cable is accompanied by extension and compression of the helix formed by the signal cable. Although this configuration relieves the problem caused by variation in pressure at the hydrophone, it creates spurious signals derived from two other sources. One of the sources comes from a physical rubbing of the signal cable on the suspension cable during extension and contraction. The other is attributed to the convolutions of the signal cable nearest to the lower end tending to bunch up due to gravity and slap sharply and suddenly against the hydrophone upon vertical movements of the system.

Furthermore, prior art sonobuoy suspension systems are difficult to deploy without tangling the cables and are relatively expensive to manufacture.

SUMMARY OF THE INVENTION

Accordingly, it is a general purpose and object of the present invention to provide a compliant sonobuoy suspension system for the suspension of a hydrophone such that noise induced by wave or flow motion through the suspension system is minimized. Another object of the invention is to provide a configuration of compliant suspension cable and signal cable such that relative motion between the signal cable and the suspension cable is likewise minimized. Still another object of the invention is to provide storage means such that the suspension system may be compactly stored and deployed smoothly, rapidly, and without entanglement of the cables.

This is accomplished according to the present invention by providing a compliant suspension cable and a signal cable disposed helically therearound and attached at measured intervals thereto. Further, there is provided a longitudinally-slotted spool for storage and retention of the cables prior to deployment, said spool allowing a smooth and rapid deployment of the cables.

BRIEF DESCRIPTION OF THE DRAWINGS

FIG. 1 is a longitudinal view, partially cut away, of a sonobuoy suspension system according to the present invention;

FIG. 2 is a pictorial representation in elevation of the system of FIG. 1 deployed in its environment;

FIG. 3 is an enlarged view of the lower end of the system of FIG. 2 with its compliant suspension cable and signal cable partially deployed; and FIG. 4 is a cross-sectional view of the lower end of the system taken along the line 4—4 of FIG. 3.

DESCRIPTION OF THE PREFERRED EMBODIMENT

Referring now to the drawings in which like reference numerals denote like elements in all drawings hereof, a sonobuoy assembly generally denoted by the numeral 10 is depicted in FIG. 1 and includes a transmitting antenna 11 extending from one end of a cylindrical casing 21 and a releasable cover plate 12 at the other end thereof. A flotation unit 22 including an electronic package, descent parachute, and means for ejecting a hydrophone assembly 13 from the container after release of the cover plate 12 is contained in said one end. The hydrophone assembly 13 is deployed from the other end of the sonobuoy upon release of the cover plate 12.

As shown in FIG. 2, the hydrophone assembly 13 includes a compliant suspension cable 14 on which a signal cable 15 of any suitable conductor material is helically disposed and attached thereto at measured intervals. The suspension cable 14 may be of any suitable compliant material such as elastic cord. The deployable ends of the cables 14 and 15 are attached to a hollow spool 16 open at one end and closed at the other with a hydrophone 20 affixed thereto. As shown in FIG. 3, the signal cable 15 is attached at measured intervals to the suspension cable 14 by fasteners 18, and both cables are deployed from the spool 16 as the hydrophone 20 is lowered from the flotation unit 22. The fasteners 18 may be any conventional means such as metal spring clips, tape or the like. The hydrophone is secured by any convenient means to the spool 16. The spool 16 includes a flange 17 about the open end which helps to retain the helically-wound signal cable 15 upon the spool 16 prior to deployment. A longitudinal slot 19 in the spool 16 receives the fasteners 18 within the slot from the open end of the spool 16 while in the assembled, undeployed state. The compliant suspension cable 14 is coiled inside the hollow spool 16 whereas the helically-wound signal cable 15 is coiled on the outside of the spool 16.

The signal cable 15 is preformed into a helix of a diameter slightly greater than the outside diameter of the spool 16 so that it may be readily received on the spool and will act as a helical spring when deployed. It also has the characteristics of a relatively rigid cable so that one open convolution between fasteners will not be pushed into contact with the compliant suspension cable 14 by water currents.

The distance between two adjacent fasteners 18 on the suspension cable 14 is determined by the spring constant of the compliant suspension cable, but its unstressed length must not exceed the inside circumference of the spool 16. The length of the convolution of the signal cable must be such that when the suspension cable is completely extended the signal cable convolution will not be fully opened so as to permit the signal cable to rub on the suspension cable. Thus, for example, if the suspension cable extends 25 percent the length of the convolution must be something greater than 25 percent of the distance between fasteners.

It should be noted that if more than one convolution between fasteners were used the signal cable would still be able to slap or rub against the suspension cable since there would be free lateral movement. Therefore it is desirable to use one or less full convolution of the signal cable between fasteners. In practice, it has been found that using less than one full convolution results in an undue multiplicity of fasteners without appreciable advantage and causes a much bulkier package than when using one full convolution in the manner of the invention.

The distance between the fasteners is determined by the inner diameter of the casing since one full coil of the signal cable between fasterners must fit inside the casing in such a manner that the fastener is received in the longitudinal slot in the spool when the cable is stored.

FIG. 4 shows the compliant cable 14 and its attendant signal cable 15 partially stored on the spool 16 and fastened through an aperture to the hydrophone. The fasteners 18 are shown received in the slot 19.

In operation, the cables may be paid off a spool rapidly and smoothly without danger of entangling each other. Furthermore because of the fastening of the cables at measured intervals, the signal cable will not rub on the suspension cable and create noise. Further, since the signal cable is in a longitudinally fixed relation to the suspension cable, it will not impinge or slap upon the hydrophone during rapid vertical movement due to wave motion and thus cause noise.

It is obvious to those skilled in the art that various modifications of the inventive concept hereof can be made without departing from the basic invention. Therefore it is intended that all matter contained in the foregoing drawings and description shall be interpreted as illustrative and not in a limiting sense.

What is claimed is:

1. A sonobuoy system, comprising:
   a flotable transmitter unit;
   a hydrophone assembly;
   a suspension system operatively connected between said unit and said assembly and including a compliant suspension cable, an electrical cable helically disposed about said suspension cable and attached thereto at each convolution; and
   a cylindrical casing formed to receive said transmitter unit in one end, said hydrophone assembly at the other end and said suspension system therebetween, whereby substantially noise-free communication is maintained between said transmitter unit and said assembly.

2. A sonobuoy system according to claim 1 wherein said hydrophone assembly comprises:
   an external condition sensing element; and
   a hollow spool attached thereto for convolutely receiving said electrical cables prior to deployment thereof.

3. A sonobuoy system acording to claim 2 wherein:
   said suspension cable is helically coiled on the inside of said spool, and said electrical cable is helically coiled on the outside of said spool.

4. A sonobuoy system according to claim 2 wherein:
   the diameter of each of said electric cable convolutions being less than the inside diameter of said casing and greater than the outside diameter of said spool;
   the diameter of said suspension cable convolutions being less than the inside diameter of said spool; and
   the length of said electrical cable between adjacent points of attachment being greater than the corresponding maximum operating length of said suspension cable.

5. A sonobuoy system according to claim 1 wherein:
   said electrical cable is preformed into a helix of predetermined diameter and is relatively inflexible.

References Cited

UNITED STATES PATENTS 3,377,615  4/1968  Lutes _____ 340—2

RICHARD A. FARLEY, Primary Examiner

U.S. Cl. X.R.

9—8